United States Patent
Zell et al.

[11] 3,772,913
[45] Nov. 20, 1973

[54] TORSIONAL RESONANT SYSTEM

[75] Inventors: Keith D. Zell, Shakopee; August T. Kaufman, Minneapolis, both of Minn.

[73] Assignee: MTS Systems Corporation, Minneapolis, Minn.

[22] Filed: Dec. 16, 1971

[21] Appl. No.: 208,628

[52] U.S. Cl. ............................. 73/67.2, 73/99
[51] Int. Cl. ............................. G01h 13/00
[58] Field of Search ............ 73/67.2, 67.3, 67.4, 73/90, 91, 92, 99; 328/168

[56] References Cited
UNITED STATES PATENTS

| | | |
|---|---|---|
| 2,836,060 | 5/1958 | Ciringione et al. .................. 73/99 |
| 3,122,915 | 3/1964 | Haller .................................. 73/99 |
| 3,442,120 | 5/1969 | Russenberger et al. ............. 73/92 |
| 3,508,159 | 4/1970 | Marpe ................................ 328/168 |
| 3,664,179 | 5/1972 | Danko et al. ....................... 73/67.2 |

Primary Examiner—Richard C. Queisser
Assistant Examiner—John P. Beauchamp
Attorney—Ralph L. Dugger et al.

[57] ABSTRACT

A resonant fatigue testing machine for testing specimens in torsion utilizing servovalve controlled rotary hydraulic actuator means. The specimen is connected to a mass which produces a spring-mass system that resonates at a selected natural frequency. The servovalve is operated in response to automatic controls to supply the necessary power to maintain resonance through the hydraulic actuator.

9 Claims, 4 Drawing Figures

INVENTORS.
KEITH D. ZELL
AUGUST T. KAUFMAN
BY
Dugger Peterson Johnson & Westman
ATTORNEYS

TORSIONAL RESONANT SYSTEM

BACKGROUND OF THE INVENTION

1. Field of the Invention

The present invention relates to fatigue testing machines for testing specimens in torsion.

2. Prior Art

U.S. Patent No. 2,587,317 shows a resonant vibration fatigue tester for torsion testing specimens, which utilizes magnets for imparting the force necessary to maintain a desired resonant frequency.

U.S. Pat. No. 2,356,894 also shows a resonant fatigue testing apparatus which has an exciter which is also magnetically operated. The specimen can be tested in torsion.

U.S. Pat. No. 3,122,915 to Haller shows a hydraulic torsion testing machine. In linear testing, or in other words testing a device in axial direction the use of fatigue testers is quite well known, and hydraulic actuators are utilized for linear actuation. Servovalve controls are used with these linear operating devices, to obtain and maintain resonance. An example of a resonant linear actuator is shown in U.S. Pat. No. 3,442,120. In this patent a mass is added to a linearly moving actuator to obtain resonating at a desired frequency, under servovalve controls.

A resonant control system for servovalve controlled hydraulic resonant machines is shown in U.S. Pat. No. 3,508,159.

SUMMARY OF THE INVENTION

The present invention relates to a fatigue test machine for resonant testing of specimens in torsion. Hydraulic power is used to maintain resonance. A mass is added to the specimen to bring the resonant frequency into the desired range.

Different forms of the invention are shown, but each of the forms includes a rotary hydraulic actuator operated through a servovalve controlled by a controller that is initially operated in response to function generator and utilizes feedback signals to insure that the proper torque level is being achieved in the specimen under test. If the controller senses that there is a differential between the desired torque and the actual torque, the servovalve is operated a sufficient amount and at a proper frequency to increase the torque in the specimen up to the desired level during each of its cycles in resonance. The actuator is controlled also in response to a differential pressure signal from the rotary actuator so the torque signal and differential pressure signals are 90° out of phase to minimize the power requirement of the system.

The forms of the invention include locating of the mass to provide rotation or torque multiplication of the specimen, a self reacting setup utilizes two inertial masses at opposite ends of the specimen, and a torsional resonating system using a mean load control so that a mean or static load can be maintained on the specimen that is being tested in torsion.

DESCRIPTION OF THE PREFERRED EMBODIMENTS

Figure 1:
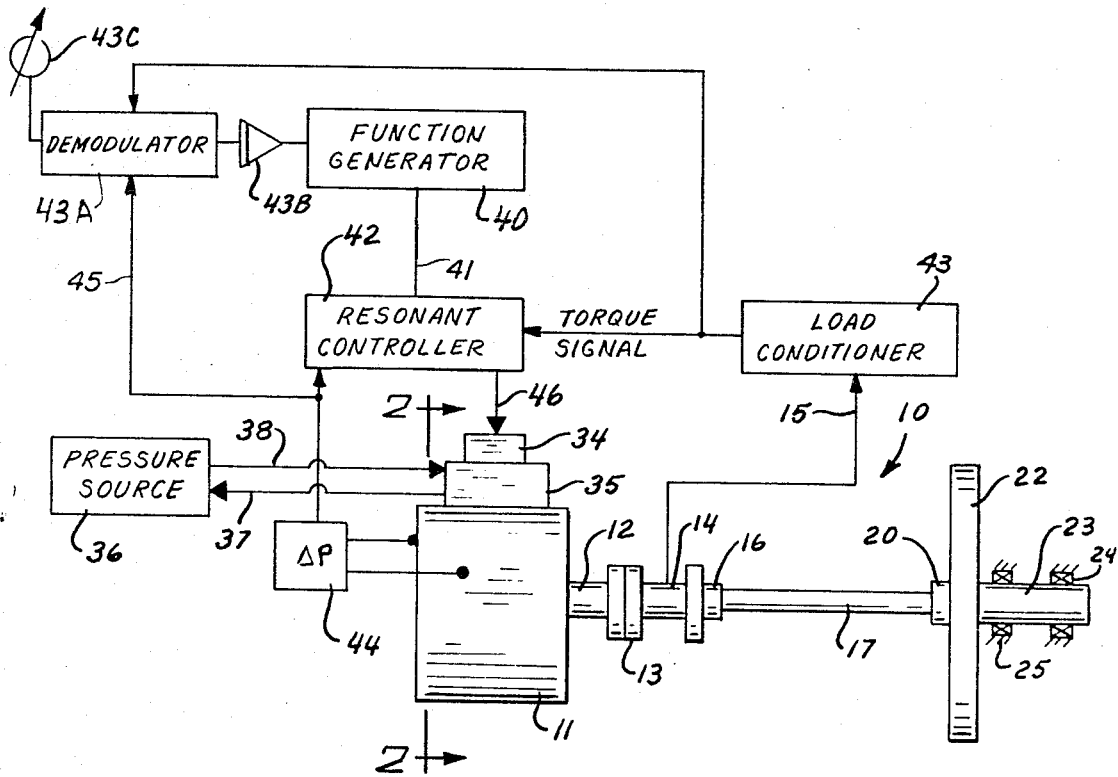
FIG. 1 is a schematic representation of a typical resonant torsional testing setup constructed according to the present invention.

A torsional resonant fatigue testing machine is shown generally and schematically at 10. The components are readily available and can be assembled by persons skilled in the art. The resonant testing machine includes a main rotary hydraulic actuator 11, which is of usual design, and which has an output shaft 12 which is connected through a coupling member 13 to an electrical signal torque cell 14. The torque cell 14 is a usual strain gage type device delivering an output electrical signal proportional to the torque so that an output line 15 carries the signal proportional to torque in the cell. The cell also includes a specimen holder 16 which mounts one end of a specimen 17 which is to be tested. The opposite end of the specimen 17 in turn is mounted in a second holder 20. The holder 20 is attached to an inertial mass flywheel 22 that is supported on a shaft 23 mounted in suitable bearings 24. The bearings in turn are mounted onto a frame or support member 25. The frame 25 can comprise a large concrete base, or some other rigid support.

The flywheel 22 comprises an inertial weight that is used for bringing the overall spring-mass ratio into a usable resonance range. The weight can be selected in accordance with known procedures, to reduce the natural frequency of the specimen-mass system to a useable range.

Figure 2:
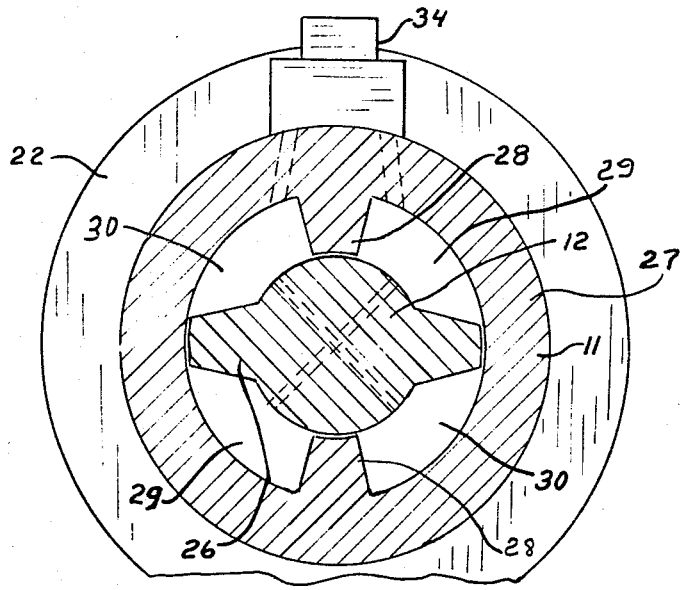
FIG. 2 is a representative cross sectional view of a rotary hydraulic actuator used with the present invention.

The controls are similar to the controls shown in U.S. Pat. No. 3,442,120 with the details of controls as shown in U.S. Pat. No. 3,508,159. These controls are embodied in a controller sold by MTS Systems Corporation of Eden Prairie Minnesota, their model 405.01 servo-controller. It should be noted that in torsional vibration, the specimen is cycled back and forth about its longitudinal axis, and the flywheel weight 22 also twists around the longitudinal axis of the specimen 17. The shaft 12 of actuator 11 as shown in FIG. 2, mounts vanes 26 for rotary movement in a housing 27 of the rotary hydraulic actuator, and stationary vanes 28 are utilized thus providing two sets of chambers 29 and 30, into which fluid under pressure can be introduced. The two chambers 29 are fluidly connected together as are the two chambers 30, so that each set acts as one chamber. The vanes 26 are actually rotary pistons and will move under differential pressure in the chamber sets and thus move shaft 12 rotationally to drive the specimen 17. The introduction of fluid under pressure into either set of the chambers 29 or 30 is controlled by a servovalve 34 that operates through a hydraulic manifold 35 to introduce pressure from a source 36 either into one or the other of the chamber sets 29 or 30, and to open the opposite chamber set to reservoir through a return line 37. The pressure line 38 supplies the fluid under pressure to the servovalve. The housing 27 for the hydraulic actuator 17 is also mounted on the frame 25 so that the unit is held together.

The specimen 17 is loaded in accordance with a predetermined program from a function generator or program controller illustrated generally at 40. This function generator generates a cyclic command control signal and is connected along line 41 to a resonant controller 42. The controller 42 controls the servovalve 34 in correspondence with the program from the function generator, and also in relation to feed back signals. The electrical feed back signal from the torque cell 15 is sent through a load conditioner 43 that provides an exciter signal and also is an electronic amplifier. The torque feed back signal is fed into the controller for the purposes diescribed in U.S. Pat. No. 3,508,159. It should be noted that the resonant controller 42 of the present drawings includes the amplitude control circuit of Pat. No. 3,508,159, and the function generator output is coupled to the amplitude control portion of the resonant controller as shown in that patent. In the present form of the invention the mean load portion of the circuit is not utilized. The feed back signal from the load conditioner 43 is also fed into an input of a demodulator 43A. In addition, a differential pressure cell 44 is utilized for sensing the differential pressure in the chambers 29 and 30 of the rotary actuator 11, and this cell 44 delivers an output voltage signal which is an oscillating electrical signal because of the resonating system, wherein the differential pressure increases and decreases during each cycle. This signal is supplied along an output line 45 to a second input of demodulator 43A.

The demodulator 43A gives an output which is a function of the difference in phase of the inputs from the differential pressure sensor and the torque cell. In order to obtain maximum efficiency from the system the differential pressure signal should be 90° out of phase with the signal from the torque cell. Thus for the desired relationship the signals from the differential pressure cell and the torque cell cancel to make a zero output from the demodulator. The demodulator is conditioned to provide a negative voltage output when the two signals go more "in phase" (less than 90° out of phase) and a positive voltage output when the signals move more out of phase (more than 90° out of phase). The output of the demodulator is passed into an electrical integrator 43B, and the output of the integrator, which includes a suitable amplifier, is applied to function generator 40 to adjust the function generator output to the controller to drive the unit at resonance. A phase adjust device 43C is coupled to the demodulator to provide phase adjustment for the differential pressure signal input in relation to the torque signal input. The adjustment is made until resonance is maintained at minimum power input. The function generator initially starts the unit cycling in torsion and the device builds into a resonant mode quickly. The function generator output then is maintained at the proper frequency and the demodulator output is used to adjust the function generator output as may be necessary to maintain the proper phase relation between the torque cell signal and the differential pressure signal.

The resonant controller output signal is supplied along line 46 to the servovalve 34 to actuate the servovalve a sufficient amount to supply fluid under pressure to the proper chamber 29 or 30 of actuator 11 to bring the torque carried by the specimen 17 up to the desired or programmed level as sensed by the torque cell 15 by use of the amplitude control such as described in Pat. No. 3,508,159. This is controlled at the desired frequency matched to the resonant frequency of the specimen-mass system. The servovalve can respond at high frequency, and the mass of flywheel or inertia weight 22 is selected to provide for a frequency in the desired range. The resonant system conserves power input, and the response of the servovalve will drive the actuator to maintain resonance for torsional fatigue testing.

The flywheel provides a torque multiplying factor in the resonanting system of FIG. 1. The input power by the actuator 11 is much lower than the maximum power carried by specimen 17 (Power = Torque × Rotation). The input provides makeup force for losses from damping, friction losses and the like. The actuator 11 is initially driven by the controller during start up to bring the system up to the resonant frequency and to subsequently provide makeup power to maintain resonance.

Figure 3:
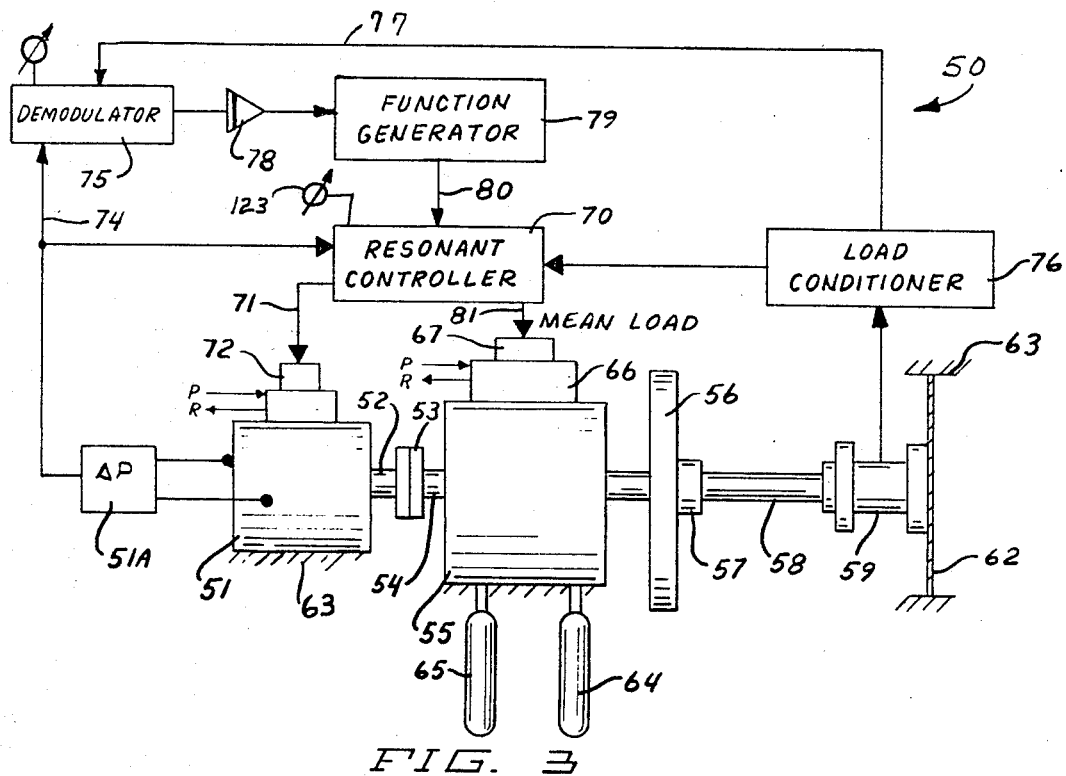
FIG. 3 is a schematic representation of a modified form of the present invention.

FIG. 3 shows a modified form of the invention, and in this form means are provided for supplying a mean load to the specimen to be tested in addition to the oscillating load. In this form of the invention, the specimen testing device shown at 50, includes a cyclic rotary hydraulic actuator 51 which is the resonant drive and which operates in exactly the same manner as that described before. Actuator 51 has an output shaft 52 that is coupled through a coupling 53 to a shaft 54 of a second hydraulic rotary actuator 55 called the mean load actuator. The mean load actuator shaft 54 is coupled to a weight or inertia mass 56, that in turn is attached through a coupling 57 to the specimen 58. The other end of specimen 58 is attached to a torque cell 59 for sensing the torque or load in the specimen. The outer end of the torque cell is mounted to diaphragm member 62 that is attached to a heavy support 63 at its outer peripheral edges. The diaphragm is a thin sheet of material that supports the torque cell and specimen radially to prevent rotation from torque but which provides some resilience for movement in axial direction. When the mean load is applied, the specimen shortens in axial direction and the diaphragm permits this axial shortening. The same controls are utilized as before, except the mean load control is added in.

The mean load rotary hydraulic actuator 55 is provided with a pair of accumulators 64 and 65, respectively, which are open to the respective chambers of the mean load actuator 55. The accumulators permit the vane inside the mean load actuator to move to compress the fluid in the respective accumulators under resonant loading, and will be means for providing a relative level mean load on the specimen 58 in one direction of loading. The mean load actuator acts as a soft spring to keep the mean load at the desired level. If desired a mechanical spring could be used to apply a mean load as well. The spring would be loaded to apply an initial torsion load on the specimen.

The diaphragm 62 of course keeps the specimen from twisting, and the torque on the specimen is sensed by the torque cell 59. The diaphragm and both rotary actuators are supported by the heavy support 63. The mean load actuator 55 is connected through a hydraulic manifold 66 to a servovalve 67 that controls the mean load in response to signals from controller 70. The mean load actuator is operated to apply an initial torque to the specimen at a mean load level. The resonant loads then cycle above and below the mean load level, but this mean load remains substantially constant because of the accumulators open to the actuator chambers. The output of the controller is then divided into two outputs, namely the mean load output which maintains the mean load on the specimen through a line 81 to a servovalve 67 operating through a hydraulic manifold to actuator 55. The mean load control in combination with the resonant control is also shown in U.S. Pat. No. 3,503,159.

A differential pressure transducer 51A is again utilized. The differential pressure transducer 51A delivers a cyclic output voltage signal along a line 74 to one input of a demodulator 75. The demodulator 75 also receives a torque feed back voltage signal which is also cyclic, from a load conditioner 76 along a line 77. The load conditioner 76 provides an excitation signal for and amplified output from the torque cell 59. The demodulator 75 operates to detect the phase difference between the input signal from the torque cell and the signal from the differential pressure transducer, and when the signals are 90° out of phase the demodulator output is at zero. When the signals are more in phase than 90°, the demodulator voltage output is positive. The output of the demodulator is sent through an integrator 78, and this output from the integrator is fed into the function generator 79. The function generator 79 operates as function generator 40. The mean load signal is programmed via a set point command 123 or else can be obtained from an auxiliary function generator. The mean load signal along line 81 is fed to the servovalve 67, and the cyclic load control signal is fed to the servovalve 72 along line 71.

It should be noted that in FIG. 1 the flywheel is positioned on the opposite end of the specimen from the rotary actuator 11, and the torque cell is at the end of the specimen 17 adjacent the rotary actuator. This provides for a rotational multiplication from the flywheel. In other words, the drive actuator travels only a small displacement, and at a much slower velocity than the flywheel.

In FIG. 3, however, the outer end of the specimen is held fixed, and while the torque cell senses the torque in the specimen, the flywheel is at the end of the specimen adjacent the actuator. This gives a torque multiplication for testing, but the actuator shaft rotates substantially as far as the flywheel rotates.

Figure 4:
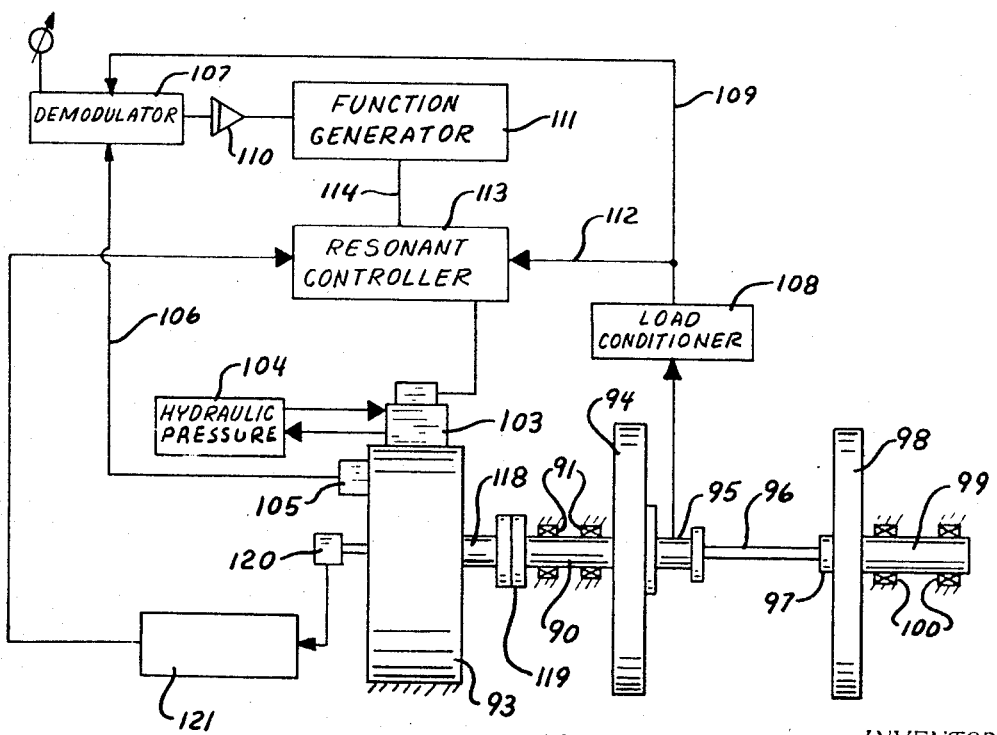
FIG. 4 is a schematic representation of a further modified form of the present invention.

In FIG. 4, a modified form of the invention is shown which includes a self-reacting flywheel set up and the typical torsional resonant control system.

In the form of the invention shown in FIG. 4, a support shaft 90 is mounted in bearings 91, which are mounted on the support frame for the entire test frame. The support shaft 90 is connected through a coupling 119 to a rotary hydraulic actuator 93, which is the same as the other rotary actuators previously described. In addition, the opposite end of the support shaft 90 is connected directly to a flywheel inertia wheight 94. A torque cell 95 is drivably coupled to the flywheel 94, and this torque cell in turn support and mounts one end of a specimen 96. The opposite end of the specimen is connected through a coupling 97 to a second flywheel 98. The flywheel 98 is mounted onto a shaft 99 that in turn is mounted in suitable bearings 100 that are mounted on the test frame. The rotary actuator 93 is controlled through a servovalve 103. This servovalve 103 is supplied with hydraulic fluid under pressure from a source indicated at 104, which includes both the pressure and return lines leading to the servovalve.

A differential pressure transducer 105 is mounted to sense differential pressure in the two chambers of the rotary actuator 103 as in the previous forms of the invention, and the voltage signal from the differential pressure transducer is supplied through a line 106 to one input of a demodulator 107. The demodulator 107 has a second input that receives a signal from a load conditioner 108 along a line 109, the load conditioner 108 supplys a torque signal from the torque cell 95 along a line 109 to the demodulator 107. The output voltage of the demodulator 107 again goes through an integrator 110, and is supplied to a function generator 111 which provides command signal for the unit. The torque signal is supplied along a line 112 to a resonant controller 113 for insuring that the resonant controller operates satisfactorily, as previously explained. The function generator gives a command output along the line 114 to this resonant controller 113.

The rotary actuator 93 output shaft 118, is connected through a coupling 119 to the support shaft 90. The rotary actuator 93 drives the shaft 118 and the shaft 90, and this way drives the specimen. The resonanting frequency of the system is selected by selecting the proper mass for the spring rate of the specimen. After initial excitation and during resonant operation the signal from the torque cell is fed back to the resonant controller, and compared with the desired signal level to insure that the unit reaches the proper load. In order to conserve energy the differential pressure cell 105 and the torque cell supply signals to the demodulator so that the function generator output drives the controller and consequently the servovalve and actuator to achieve a 90° out of phase relationship between the torque signal and the differential pressure signal. When this occurs, the efficiency of the system is at a maximum.

In the device of FIG. 4, the rotary actuator 93 includes a stroke sensing device 120, which senses the position of the rotary actuator with relation to the outer housing vane or some other suitable angle sensor may be used. The signal is sent from circuitry 121 into the resonant controller so that the position of the rotary actuator vane or driving member can be adjusted with respect to the outer housing of the actuator to insure that the vane is properly positioned in the rotary actuator to prevent interference between moving vane and the stationary vane, or in other words insure that there is no "bottoming out" of the actuator during operation.

In all forms of the invention, the differential pressure signal from the actuator may also be used in the resonant controller for a feed back for stability. This may provide higher electronic gain settings in the servo controller in some cases.

The stroke control devices may be used with any of the actuators if desired. Stroke control rather than torque control can be maintained as desired.

The demodulator in each form of the invention includes a phase adjustment device to adjust the differential pressure signal into proper phase relationship with the torque cell feed back signal to minimize power input at resonance.

The servovalves used are electrohydraulic proportional servovalves that are capable of providing a high frequency response for resonant operation. The hydraulic fluid used of course is a substantially noncompressible fluid.

The flywheel weight determines the natural frequency of the system and also therefore changes the flow requirements of the servovalves and actuator size. The larger the weight, the lower the frequency and the less flow required to operate. Thus by selecting the flywheel weight the optimum operation for a given actuator and associated controls can be achieved.

What is claimed is:

1. A hydraulic resonant test device for testing specimens in torsion comprising a support means to mount said specimen, flywheel means acting in combination with said specimen mounted for rotation therewith adjacent at least one end thereof, a rotary hydraulic actuator having internal chambers divided by an active pressure responsive element, connected to drive said specimen, fluid pressure means, servovalve means coupled to said rotary hydraulic actuator to provide fluid pressure to said chambers of said hydraulic actuator to supply force to rotate said specimen in either direction of rotation about a longitudinal axis of said specimen, differential pressure means for sensing the pressure difference in said chambers in said rotary actuator, and delivering a signal proportional thereto, torque cell means for sensing the torque in said specimen and delivering a signal proportional to torque, means for comparing the output signals of said differential pressure sensor and said torque cell means to supply a control signal which is a function of the difference in phase between said differential pressure signal and said torque cell signal, controller means, means coupling said torque cell means to said controller means, means coupling said comparing means to said controller means, said controller means being responsive to said control and torque signals to produce a cyclic command signal for driving said servovalve means and said rotary actuator at a phase and frequency to maintain resonance and to minimize the power input to said hydraulic actuator means while maintaining a desired torque in said specimen.

2. The combination as specified in claim 1 wherein said flywheel means is connected to said specimen at an opposite end thereof from said rotary hydraulic actuator, and said torque cell is connected to the end of said specimen adjacent said rotary hydraulic actuator.

3. The combination as specified in claim 1 wherein said flywheel means is connected to said specimen at the end thereof adjacent said rotary hydraulic actuator, and said torque cell means is adjacent an opposite end of said specimen.

4. The combination as specified in claim 1 wherein said flywheel means comprises a pair of flywheels, one drivably mounted at each end of said specimen.

5. The combination as specified in claim 1 wherein said flywheel means and hydraulic actuator means are mounted adjacent the first end of said specimen, and said hydraulic actuator means comprises a mean load actuator to apply selected load in a first direction of rotation on said specimen, and a cyclic actuator means operated to maintain resonance of the system.

6. The combination as specified in claim 5 and diaphragm means supporting an end of said specimen against rotation said, diaphragm means deforming to permit axial length changes of said specimen.

7. The combination of claim 1 and means to apply a substantially uniform torsional load to said specimen in addition to cyclically applied load.

8. The combination as specified in claim 5 and means supporting one end of said specimen to substantially prevent rotation of said one end but permit at least limited axial movement of said specimen.

9. The combination as specified in claim 1 and means to apply a mean load to said specimen during cyclic operation, said flywheel being of a selected mass to match the flow capabilities of said rotary actuator and servovalve.

* * * * *

PO-1050
(5/69)

UNITED STATES PATENT OFFICE
CERTIFICATE OF CORRECTION

Patent No. 3,772,913      Dated November 20, 1973

Inventor(s) Keith D. Zell et al.

It is certified that error appears in the above-identified patent and that said Letters Patent are hereby corrected as shown below:

Column 3, line 8 "diescribed" should be--described--. Column 7, line 11, (Claim 1, line 10) before "hydraulic insert --rotary--; Column 7, line 15, (Claim 1, line 14) before "actuator" insert--hydraulic--; Column 7, line 28, (Claim 1, line 27) before "actuator" insert--hydraulic--; Column 7, line 30, (Claim 1, line 29) before "hydraulic" insert--rotary--; Column 7, line 31, (Claim 1, line 30) take out--means--. Column 8, line 12, (Claim 5, line 2) before "hydraulic" insert--rotary--; same line take out--means--; Column 8, line 14, (Claim 5, line 4) before "hydraulic" insert--rotary--; same line take out--means--. Column 8, line 20, (Claim 6, line 3) "rotation said," should be--rotation, said--.

Signed and sealed this 16th day of April 1974.

(SEAL)
Attest:

EDWARD M.FLETCHER,JR.
Attesting Officer

C. MARSHALL DANN
Commissioner of Patents